(12) United States Patent
Spence

(10) Patent No.: US 8,149,494 B1
(45) Date of Patent: Apr. 3, 2012

(54) TWO-PHOTON ABSORPTION SWITCH HAVING WHICH-PATH EXCLUSION AND MONOLITHIC MACH-ZEHNDER INTERFEROMETER

(75) Inventor: Scott E. Spence, Fredericksburg, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 906 days.

(21) Appl. No.: 12/228,322

(22) Filed: Aug. 6, 2008

Related U.S. Application Data

(60) Provisional application No. 60/993,100, filed on Sep. 7, 2007.

(51) Int. Cl.
 *G02F 1/01* (2006.01)
 *G02B 1/10* (2006.01)
 *G02B 27/12* (2006.01)

(52) U.S. Cl. .................. 359/288; 359/583; 359/639

(58) Field of Classification Search .............. 359/288, 359/578, 580, 583, 586, 587, 589, 590, 629, 359/634, 636–638
See application file for complete search history.

(56) References Cited

U.S. PATENT DOCUMENTS

| | | | | |
|---|---|---|---|---|
| 4,523,846 | A | 6/1985 | Breckinridge et al. | 356/346 |
| 5,420,688 | A | 5/1995 | Farah | 356/358 |
| 6,538,747 | B1 | 3/2003 | Arnold | 356/512 |
| 6,550,330 | B1 | 4/2003 | Waters et al. | 73/514.26 |
| 7,149,378 | B2 | 12/2006 | Baumann et al. | 385/16 |
| 7,315,381 | B2 | 1/2008 | Sesko et al. | 356/493 |
| 7,336,369 | B2 | 2/2008 | Eckes et al. | 356/500 |
| 7,359,058 | B2 | 4/2008 | Kranz et al. | 356/452 |
| 2007/0109552 | A1 | 5/2007 | Felix et al. | 356/491 |
| 2008/0068721 | A1* | 3/2008 | Murnan et al. | 359/629 |

OTHER PUBLICATIONS

A. Einstein et al., "Can Quantum-Mechanical Description of Physical Reality Be Considered Complete?", *Phys Rev.* 47 (1935), 777-780.
N. Bohr, "Can Quantum-Mechanical Description of Physical Reality Be Considered Complete?", *Phys Rev* 48 (1936), 696-702.
J. S. Bell, "On the Einstein Podolsky Rosen Paradox", *Phys* 1 (1964), 195-200.
A. Aspect, "Bell's Inequality Test", *Nature* 398 (1999), 189-90.
Z. Y. Ou et al., "Vacuum Effects on Interference in a Two-Photon Down Conversion", *Phys Rev A* 40 (1989), 1428-35.
Z. Y. Ou et al., "Coherence in Two-Photon Down-Conversion Induced by a Laser", *Phys Rev A* 41 (1990), 1597-1601.
X. Y. Zou et al, "Induced Coherence and Indistinguishability in Optical Interference", *Phys Rev Lett* 67 (1991) 318-21.
K. J. Resch et al., "Nonlinear Optics with Less than One Photon", *Phys Rev Ltrs* 87 (2001) 123603-14.
S. E. Spence et el., "Experimental Evidence for a Dynamical Non-Locality Induced Effect in Quantum Interference Using Weak Volues", *Foundation of Physics* (2011), DOI: 10.1007/a10701-011-9596-6. Content available at http://arxiv.org/PS_cache/arxiv/pdf/1010/10103289v1.pdf.

* cited by examiner

*Primary Examiner* — Dawayne A. Pinkney
(74) *Attorney, Agent, or Firm* — Gerhard W. Thielman, Esq.

(57) ABSTRACT

A monolithic Mach-Zehnder Interferometer (MZI) is provided for photon beam-splitting and beam-combining with accurate super-positioning of the outgoing beams, which creates the interference. The MZI includes a complimentary pair of right-isosceles triangular prisms, and several reflector units. The triangular prisms are configurable to physically join together along associated hypotenuse surfaces that form a beam-splitter interface, thereby producing a rectangular prism having a square cross-section with four outer side surfaces. Each reflector unit forms a right-isosceles mirror that rigidly faces a corresponding surface of the four outer side surfaces of the rectangular prism. The MZI further includes a spacer disposed between the corresponding surface and the each reflector unit.

12 Claims, 10 Drawing Sheets

Beam-splitter in access space
Trombone prisms for upper and lower monoliths
Beam-splitter of large cube of monolith

TWO-PHOTON ABSORPTION SWITCH HAVING WHICH-PATH EXCLUSION AND MONOLITHIC MACH-ZEHNDER INTERFEROMETER

CROSS REFERENCE TO RELATED APPLICATION

Pursuant to 35 U.S.C. §119, the benefit of priority from provisional application 60/993,100, with a filing date of Sep. 7, 2007, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to better devices for improvements in a two-photon absorptive switch and for improvements in stability for single or interconnected interferometers. In particular, the invention incorporates a non-critically phase-matched (NCPM) crystal to improve the performance of a two-photon absorption (TPA) switch. Additionally, the invention incorporates monolithic optics to improve the stability of Mach-Zehnder Interferometer (MZI) devices.

Quantum optic interference can be compromised under two-slit conditions by which-path information of photons within an experimental apparatus, the identity of the path taken by the photon being known as complete "which-path" information. It is desirable that an Einstein-Podolsky-Rosen (EPR) state (e.g., a "two-photon" quantum state) remains free from which-path information. The EPR state originated with a gedanken challenge posed to quantum mechanics in its formative years regarding completeness by A. Einstein, B. Podolsky and N. Rosen in "Can Quantum-Mechanical Description of Physical Reality Be Considered Complete?", *Phys. Rev.* 47 (1935) 777-780, to which N. Bohr responded the following year in an article of the same title in *Phys. Rev.* 48 (1936) 696-702.

Einstein had contemplated that local realism as spatial separation of two systems cannot influence one another because a mediating influence is bound by locality (relativistic laws), and hence there can be no causality (cause and effect) between the two systems. Subsequently, J. S. Bell restated this assertion in "On the Einstein Podolsky Rosen Paradox", *Physics* 1 (1964) 195-200 demonstrating that local realism as contemplated by Einstein yields an algebraic prediction called Bell's inequality, which involves hidden variables that could potentially complete quantum mechanics. However, Bell's inequality is violated by predictions of quantum mechanics. Thus, local realism cannot be used to complete quantum mechanics.

Bell's theorem was further refined for experimental practicality by J. F. Clauser, M. A. Horne, A. Shimony and R. A. Holt in "Proposed Experiment to Test Local Hidden-Variable Theories", *Phys. Rev. Lett.* 23 (1969) 880-884, typically referenced as CHSH. Empirical verification of Bell's inequalities being violated using entangled photons by A. Aspect, P. Grangier and G. Roger in "Experimental Realization of Einstein-Podolsky-Rosen-Bohm *Gedanken-experiment*: A New Violation of Bell's Inequalities", *Phys. Rev. Lett.* 49 (1982) 91-94 demonstrated the absence of hidden-variables and confirmed the existence of non-locality of entangled particles. These developments are summarized by A. Aspect in *Nature* 398 (1999) 189-190.

Experimental proposals employed discrete parameters, such as spin and/or polarization, rather than continuum quantities, such as momentum. Most experiments designed to test Bell's theorem have been based on polarization of photons, rather than spins of electrons. The empirical confirmation of entanglement (linking properties of spatially separated particles) has led to further developments that exploit this principle in quantum mechanics, including advances in interferometry.

Interferometry provides the technique of using an interference pattern created by the superposition of two or more waves to diagnose the properties of the aforementioned waves. (It should be noted that a photon has an associated quantum mechanical wave.) The instrument used to interfere the waves together is called an interferometer. Typically, a single incoming beam of light is split into two identical beams by a grating or a partial mirror. Each of these beams will travel a different route, called a path, before they are recombined at a second beam-splitter. An accurate superposition of the two outgoing beams from the second beam-splitter creates an interference pattern. The path distance traveled by each beam creates a phase difference between them. This phase difference shifts the interference pattern between initially identical waves to indicate a phase shift along the paths, such a phase shift can occur due to a change in refractive index and/or path length.

In particular, a Mach-Zehnder Interferometer (MZI) can be used to determine phase shift in a sample object within the path of one of two collimated beams having planar wavefronts from a coherent light source, such as a laser. A collimated source beam is split by a half-silvered mirror into two resulting beams: a "sample beam" and a "reference beam", each is then reflected by a fully-silvered mirror. The "sample beam" passes through an object that is inserted during one experimental run and removed during another experimental run, whereas the "reference beam" does not have any objects inserted or removed for the experimental runs. The two beams then pass a second half-silvered mirror.

Transmission through the sample medium reduces the light velocity to $v=c/n$, where c is light speed in vacuum and n is the medium's index of refraction, thereby causing a phase shift proportional to the difference in the medium's refractive index (from the displaced medium's refractive index) multiplied by the distance traveled. In the absence of the object, interference profile can be determined. By contrast, a sample object placed in the path of the sample beam changes the position of the interference profile, enabling the resulting phase shift to be calculated.

Three-wave mixing is the process involving a pump beam, signal beam, and idler beam. For the sake of simplicity, the degenerate case is assumed throughout this disclosure. The degenerate case is when the signal and idler beam have the same angular frequency. The higher energy pump photon can generate two lower energy photons, or the two lower energy photons can generate one high energy pump photon. Both processes are reversible. Thus, the down-conversion can be followed by an up-conversion in the same crystal or by a subsequent similar crystal. The bandwidth of the pump beam is typically smaller than the bandwidths of either signal or idler beams, and pulse lasers are employed for the two-photon absorptive switch for this reason. The optical bandwidth of a pulse laser is generally larger than the optical bandwidth of a continuous-wave (cw) laser.

Thus, one can more easily match the signal and idler bandwidths equal to the pump bandwidth with optical bandwidth filters. This bandwidth matching is needed for a two-photon absorption (TPA) switch. That is, bandwidth matching is a requirement for the reversibility between the down-conversion and up-conversion processes. Filters can be placed in front of any detector or detection process to fulfill this requirement. Two-particle absorption (TPA) represents the simultaneous absorption of two photons in order to excite a molecule from one state (such as ground) to a higher-energy state. Generally, TPA provides a non-linear effect in a two-stage process: first to induce the crystal bonds to behave non-linearly, and second to comply with conservation (e.g., momentum conservation or phase-matching). The first stage can be understood by analogizing the crystal atoms and their bond-like masses connected together by springs.

Within the linear domain, stretch of the spring obeys Hooke's law. Hence, for masses set in motion at some driving angular frequency $\omega$, the masses would continue to vibrate at the angular frequency $\omega$ after release of the driver. The electric field in a light-wave moves past a point in a crystal at angular frequency $\omega$, thereby causing a charged mass to vibrate at the angular frequency $\omega$. The charged masses collectively reradiate the light in the same direction and with the same $\omega$ vibration. This description is a classical view of light moving through a linear material. However, for springs that are sufficiently stretched, the masses would continue to vibrate at $\omega$, but could also vibrate at $2\omega$, or anharmonically. This description is a classical view of intense light moving through a non-linear material. Because light is quantized into "photons", the particle picture would suggest that two low-energy photons at angular frequency $\omega$ could be combined into one high energy photon at $2\omega$. By this classical analogy, particle illustration for TPA emerges.

The susceptibility is a constant of proportionality that is multiplied by the electric field strength to obtain the macroscopically averaged electric dipole of a medium, if the material is in the linear domain when the dipoles behave harmonically. However, the incident light can become sufficiently intense, without disassociating the dipoles, so that the dipoles behave anharmonically. In this domain, non-linear susceptibilities may appear. These susceptibilities are based upon symmetry or anti-symmetry properties of the material. Typically, crystals can have even-order non-linear susceptibilities of which the second-order is dominant. Alternatively, certain amorphous materials, can have odd-order non-linear susceptibilities of which the third-order is dominant. This disclosure mainly describes the second-order non-linearity. Generation of two low-energy photons from one high-energy photon for the purpose of generating a "two-photon" quantum state often employs a non-linear, non-centrosymmetric crystal, also known as a $\chi^{(2)}$ crystal.

Quantum optics employs parametric down-conversion of photons. Under Spontaneous parametric down-conversion (SPDC), a non-linear crystal splits an incoming photon into a pair of photons of lower energy—called "signal" and "idler" photons—whose combined energy and momentum equals those of the original photon, leaving the state of the crystal unchanged under conservation laws.

Photon conversion can be referenced between three photons as the pump→signal+idler, in a down-conversion and signal+idler→pump in an up-conversion. Phase-matching dictates entanglement of the photon pair in the frequency domain. Conservation of energy $\hbar\omega$ (Dirac constant multiplied by angular frequency) requires frequencies obey the relation $\omega_p=\omega_s+\omega_i$, and degeneracy imposes $\omega_s=\omega_i=\frac{1}{2}\omega_p$, where subscripts p, s and i respectively denote the pump, signal and idler photons. Conservation of momentum k (a.k.a. phase-matching) requires the momenta vectors obey the relation $k_p=k_s+k_i$.

SPDC creates the photon pairs at random intervals. Detection of one (signal) indicates presence of the other (idler) photon. Polarization between the signal and idler photons is the same for type I, or else is perpendicular to each other for type II. SPDC enables creation of optical fields containing (approximately) a single photon, also known as a Fock state. The Fock state has a well-defined number of particles in each state. For simplicity, a single mode (e.g., a harmonic oscillator) has a Fock state of the type $|n\rangle$ with n being an integer value, meaning that there are n quanta of excitation in the mode. A ground state (i.e., having no photons) corresponds to type $|0\rangle$.

Bra-ket notation was created by Paul A. M. Dirac to describe quantum states in quantum mechanics. The inner (or dot) product of two states $\phi$ and $\psi$ is denoted by a bracket, $\langle\phi|\psi\rangle$, consisting of a left part, $\langle\phi|$, called the "bra" for the $\phi$ state, and a right part, $|\psi\rangle$, called the "ket" for the $\psi$ state. In quantum mechanics, the expression $\langle\phi|\psi\rangle$ that represents the coefficient for the projection of $\psi$ onto $\phi$ is typically interpreted as the probability amplitude for the state to collapse $\psi$ into the state $\phi$.

The ket can be expressed as a column vector such as for a discrete representation of the wave-function (or state), $|\psi\rangle=(c_0,c_1,c_2,\dots)^T$ with c representing complex coefficients. (In infinite-dimensional spaces, the ket may be written in complex function notation, by pre-pending it with a bra, such as in example, $\langle x|\psi\rangle=\psi(x)=ce^{-ikx}$.) Every ket $|\psi\rangle$ has a dual counterpart called bra, written as $\langle\psi|$. For example, the bra corresponding to the ket $|\psi\rangle$ above would be the row vector $\langle\psi|=(c^*_0,c^*_1,c^*_2,\dots)$.

A given wave-function (or state) of a particle can be represented, in a discrete representation of the wave-function (or state), by a ket as earlier shown. For two particles, a separable product of kets can be made when the state of one particle does not imply the state of another particle. However, for two-entangled particles, a separable product of kets can not be made, because the state of one particle implies the state of the other particle. Bell states, as described later, are such non-separable states.

SUMMARY

Conventional Bell-state systems yield disadvantages regarding which-path information that are addressed by various exemplary embodiments of the present invention. In particular, various exemplary embodiments provide a two-photon absorption (TPA) switch for minimizing which-path information in quantum optic interference. The TPA switch includes a pulse laser, first and second dichroic mirrors, a down-conversion crystal, a reflector, and a beam-splitter. The down-conversion crystal is disposed between the dichroic mirrors along the incident direction and is non-critically phase-matched with down-conversion from the pump photon to signal and idler photons controlled by temperature of the crystal. The crystal can preferably be composed of one of Lithium Triborate and Ammonium Dihydrogen Phosphate.

Specifically, the pulse laser emits a pump photon traveling along a photon-incident direction. The first and second dichroic mirrors are disposed along the incident direction and oriented to enable photons to either pass therethrough or perpendicularly reflect to parallel corresponding photon-reflection directions that are perpendicular to the incident direction. The reflector is disposed beyond the dichroic mirrors along the incident direction and opposite the pulse laser. The beam-splitter is disposed along one of the reflection directions to probabilistically reflect one of the signal and idler photons to pass through the crystal.

Various exemplary embodiments also provide a monolithic Mach-Zehnder Interferometer (MZI) for photon beam-splitting, the MZI includes a complimentary pair of right-isosceles triangular prisms, and several porro reflector units. The triangular prisms are configurable to physically join together along associated hypotenuse surfaces that form a beam-splitter interface, thereby producing a rectangular prism having a square cross-section with four outer side surfaces. Each reflector unit forms a right-isosceles mirror that rigidly faces a corresponding surface of the four outer side surfaces of the rectangular prism. The MZI can further include a spacer disposed between the corresponding surface and the each reflector unit.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

Figure 1:
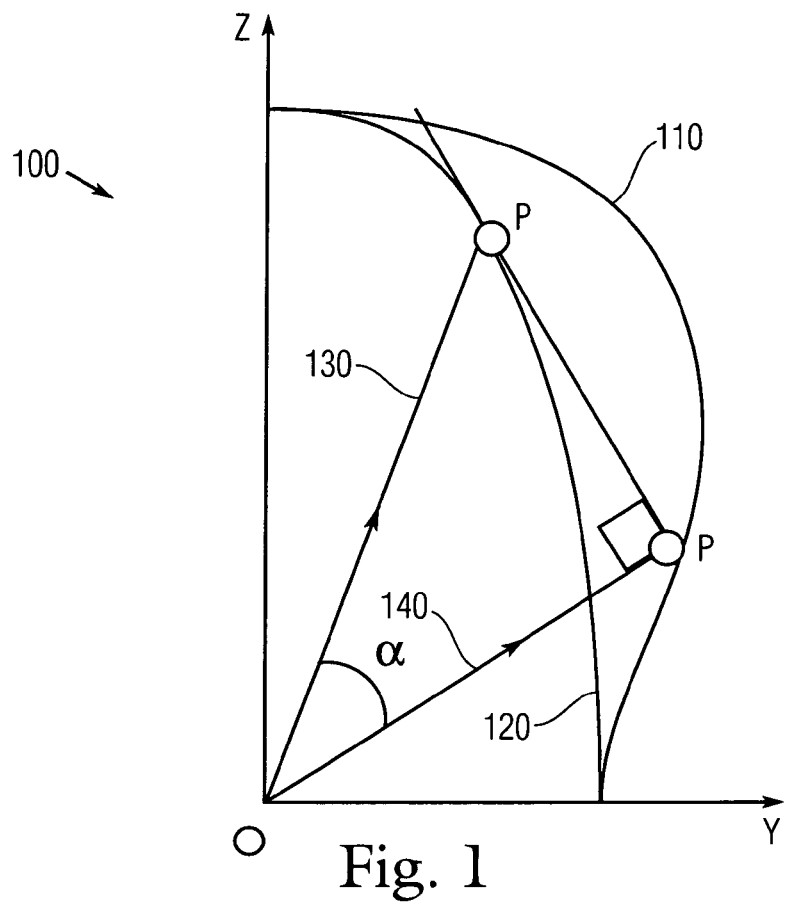
FIG. 1 is a diagram to illustrate photon propagation using ray and normal surfaces.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

A two-photon absorption (TPA) switch represents a switching device triggered by up-conversion of two low-energy photons to one high-energy photon. TPA produces an apparent absorption by a three-wave mixing process. The TPA switch can be improved by using an optical generator that is free of which-path information. This contrasts with the conventional TPA switch that possesses which-path information and employs angle tuning for the crystal. All of the which-path information can be made negligible by the appropriate non-linear crystal using temperature tuning as disclosed herein. This contrasts with angle tuning, having geometric interpretation of the optics inside a non-linear crystal resulting in a disadvantage of walk-off angle. These aspects are subsequently described in further detail.

Various exemplary embodiments provide improvements in the interferometric measurements of material samples by reducing the certainty that paths can, in principle, be deduced, thus greatly reducing which-path information. The degree that which-path information destroys interference correlates to the degree that the information can be known in principle, and relates to reducing the loop-hole aspect in experiments from attempts to create experimental conditions for several quantum foundation parameters of interest.

This disclosure, comparing purely quantum effects versus classical effects relates to utility as a device. The purity of the quantum mechanical effect represents an important contribution to this technology. In device terminology, various exemplary embodiments greatly increase the coupling/conversion efficiency of the photons in the switch, such that the likelihood of switching becomes more efficient. The overall result of these two improvements allows the efficiency of the switch to operate near 100% (percent) theoretical performance. Thus, this increase in performance becomes very useful in quantum optical device technology. Photonic devices are very mature and lend themselves to devices that could potentially be field-able in the nearer future than technologies using so called material particles.

Various exemplary embodiments operate in the realm of discrete quantum optics, in which the photons are sparse and spread thinly in time and space, in a fashion that can be referred to as anti-bunching. For a number of photons in this condition, the quantum mechanical state is said to be in a number (or Fock) quantum state. This Fock quantum state is much different than the continuous quantum states described as either a coherent or a squeezed quantum state.

The quantum noise distribution is related to a Heisenberg uncertainty principle that is known for material particles in momentum and position. In the continuous optical state, with classical noise greatly reduced, there is a residual quantum noise in the field amplitudes that must remain present. If the quantum noise is equally (uniformly) distributed along the sinusoid of the electro-magnetic wave, the quantum state can be described as being coherent (or in the coherent state). If the quantum noise is reduced more in the amplitude quadrature of the sinusoid, the quantum state can be described as being amplitude-squeezed. For the reduction of quantum noise in the phase quadrature, the quantum state can be described as being phase-squeezed.

In the generation of two low-energy photons from one high-energy photon to generate a "two-photon" quantum state, contemporary preferences favor a non-linear, non-centrosymmetric crystal, also known as a $\chi^{(2)}$ crystal. There are currently several available $\chi^{(2)}$ crystal types having different operating domains. The $\chi^{(2)}$ crystals have non-linearities describable in a tensor format, generally related to the i, j, or k direction of the polarization of the three photons.

The degenerate angular frequency conversion condition for momentum matching (e.g., in a type II degenerate angular frequency case using notation of f (fast) and s (slow) for biaxial crystals), also known as phase-matching, $2n_f^{2\omega}=n_f^{\omega}+n_s^{\omega}$, is generally not satisfied inside of the crystal, and thus may be compensated for by angle-tuning. For extraordinary beams, the index of refraction is a function of the two angles, $\theta$ and $\phi$ for biaxial crystals that are defined relative to the crystallographic axes. Although angle-tuning can in principle be used to satisfy the preceding equation, the beams do not stay together and cause undesired gain in which-path information. In addition, the walk-off limits coupling among the signal and idler photons.

FIG. 1 shows a diagram 100 of photons that enter an anisotropic medium. Normal and ray surfaces 110, 120 are shown in cross-section in the y-z plane. A photon would travel from origin O to reach point P by a photon-travel vector 130. However, the anisotropic medium influences the actual photon direction to point P' indicated by an energy-flow vector 140, as adapted from M. Born and E. Wolf, *Principles of Optics* 7/e, Cambridge, ©1999, ISBN 0521642221. Vectors $\vec{OP}$ and $\vec{OP'}$ denote rays originating at point O and respectively traveling to points P and P' respectively. The ray surface 120 can be constructed from all possible $\vec{OP}$ vectors 130, and the normal surface 110 can be constructed from all possible $\vec{OP'}$ vectors 140.

An angular offset denoted by walk-off angle α relates to the anisotropy that is seen by a particular photon. The anisotropy seen by a photon is a function of the polarization of the photon. The walk-off angle α for a down-converted photon inside of a crystal can produce which-path information for two photons that have a different polarization, if the walk-off angle α causes that photon (signal or idler) to follow a different path than its counterpart-twin photon (idler or signal). The degree of information produced from inside of the crystal relates to the difference of the two photon paths relative to each other.

Figure 2:
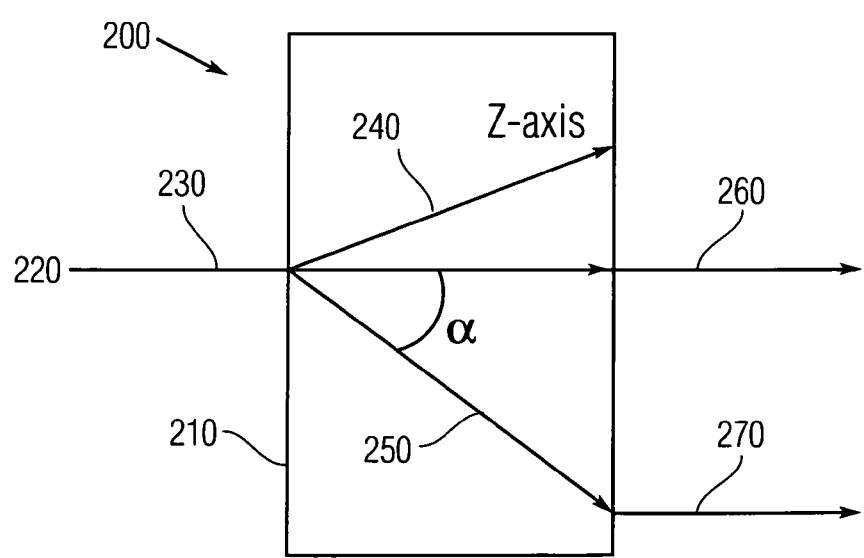
FIG. 2 is a diagram to illustrate walk-off angle for a down-converted photon.

FIG. 2 shows a diagram 200 further illustrates the idea of which-path information. A crystal 210 receives an incident photon 220 traveling on an incident path 230 that tilts relative to the z-axis 240 of the crystal. Upon striking the surface, the incident photon 220 travels along medium path 250, which is angularly separated from its incident direction by the walk-off angle α. In the absence of walk-off, the photon 220 upon exiting the crystal 210 would travel along a first exit path 260 collinear with the incident path 230. However, with walk-off, the photon 220 travels instead along a second exit path 270 parallel to but offset from the incident path 230. If a twin photon of a different polarization state were co-linear with the incident path 230, the twin photon could see either a different walk-off angle, including no walk-off angle. The difference in the walk-off angles between the twin photons generates which-path information. Phase-matching with angle-tuned crystals encounters the disadvantage that the beams usually do not translate along a principal dielectric axis so as to avoid walk-off and thereby negate introduction of which-path information.

Construction of a two-photon absorption (TPA) switch has conventionally been compromised by incidence of photon walk-off. Various exemplary embodiments enable the use of temperature-tuned crystals, rather than angle-tuned crystals. These temperature-tuned crystals are also known as non-critical phase-matching (NCPM) crystals, which can be fabricated to avoid walk-off, thus avoiding the generation of which-path information. Using NCPM crystals, the down-converted photons propagate together enabling a greater overlap of the photons to allow for a subsequent up-conversion to occur. The TPA switch operates more effectively absent walk-off, by facilitating the up-conversion in the absorption process.

An investigation incorporating information from technical literature and using computer programming with Mathematica® revealed for uniaxial crystals the possibility of type I NCPM, but not type II NCPM. The literature sources included A. Yariv, *Quantum Electronics*, Wiley, ©1989; and V. Dmitriev, G. Gurzadyan and D. Nikogosyan, *Handbook of Nonlinear Optical Crystals* 3/e, Springer, ©1999, ISBN 3540653945. For example, type I NCPM was calculated for Ammonium Dihydrogen Phosphate (ADP) in the x-y plane (θ=90° and φ=45° that 0.25725 μm down-converts 0.5145 μm at −13.3° C. ADP has a chemical composition of $NH_4H_2PO_4$ and represents a negative uniaxial crystal with a $\overline{4}2$ m point group (tetragonal) and a wavelength transparency range of 0.185 μm to 1.45 μm.

Further investigations revealed that for biaxial crystals, type I and II NCPM is possible. Type I NCPM was calculated for Lithium Triborate (LBO) along the x axis (θ=90° and φ=0° that 0.532 μm down-converts to 1.064 μm at 148° C. Type II NCPM was calculated for LBO along the z axis (θ=0° and φ=0°) that 0.65 μm down-converts to 1.30 μm at 53.2° C. LBO has a chemical composition of $LiB_3O_5$ and represents a negative biaxial crystal with an mm2 point group (orthorhombic) and a wavelength transparency range of 0.155 μm to 3.2 μm. (The point groups are designated by Hermann-Mauguin notation for symmetry elements.)

Type I NCPM can be produced by ADP and possibly another crystal with the same crystallographic point group as ADP. Types I and II NCPM can be produced by LBO and possibly another crystal with the same point group as LBO. After the material has been selected, the $\chi^{(2)}$ crystal can be cut and housed with proper orientation using conventional manufacturing techniques. Type II NCPM is particularly useful for the EPR-like states of a) and b) of the Bell states, whereas type I NCPM is useful for non-EPR-like Bell states of c) and d), with alternate optical configurations for their generation. The two different polarization states facilitate experimental utilization of the TPA switch using the type II NCPM because polarization optics can be used to optically manipulate the photons.

The above-mentioned results of the investigation related a few of the data points for temperature tuning phase-matching. A temperature range of about −15° C. to 150° C. was determined to cause phase-matching with a concurrent change in the wavelengths. Also, some very high and low temperature extremes can be used, but these were not included in the investigation results. Very high or very low temperatures have their own experimental complications, but do not necessarily deter the up- or down-conversion process from occurring.

A "two-photon" wave-function state $|\Psi\rangle$ can be one of the four so-called Bell states for the particle spins:

a) $\frac{1}{\sqrt{2}} |\leftrightarrow_1 \updownarrow_2 - \updownarrow_1 \leftrightarrow_2\rangle$, b) $\frac{1}{\sqrt{2}} |\leftrightarrow_1 \updownarrow_2 + \updownarrow_1 \leftrightarrow_2\rangle$, c) $\frac{1}{\sqrt{2}} |\leftrightarrow_1 \leftrightarrow_2 - \updownarrow_1 \updownarrow_2\rangle$, and d) $\frac{1}{\sqrt{2}} |\leftrightarrow_1 \leftrightarrow_2 + \updownarrow_1 \updownarrow_2\rangle$, where ↔ is horizontal state in the left-right directions herein (often denoted in literature as H), and ↕ is vertical state in the up-down directions (often denoted in the literature by V).

The Bell state indicated by a) represents the most closely optical analog of the EPR state for material "two-particle" state in the spin-singlet state. (The term "particle" in this context refers to members of the fermion family, e.g., the electron. By contrast, the photon is categorized in the boson family.) In this analogy, instead of horizontal state of the photon, the material particle state can be a spin-up state measured along for example in the z-axis. Similarly, instead of vertical state of the photon, the material particle state can be a spin-down state measured along the z-axis.

Hence, the above correspondences enable photons to be used instead of material particles, such as electrons. The Bell state indicated by b) can usually be substituted for the EPR state a) in experiments in which the normal down-conversion state occurs between two photons that are polarization entangled. (The Bell states indicated by c) and d) are usually not considered to have close analogies with an EPR state.) Consequently, an appropriately-designed temperature-tuned crystal can down-convert into the EPR state described by the Bell state b) above with greater utility, because of the absence of walk-off.

A further extension of the disclosure operates with two $\chi^{(2)}$ crystals without generating which-path information. This can also generate the EPR states of a) or b) above with an increase in the efficiency. Various exemplary embodiments provide an improved method for polarization-and/or-energy entanglement than available conventionally.

Figure 3:
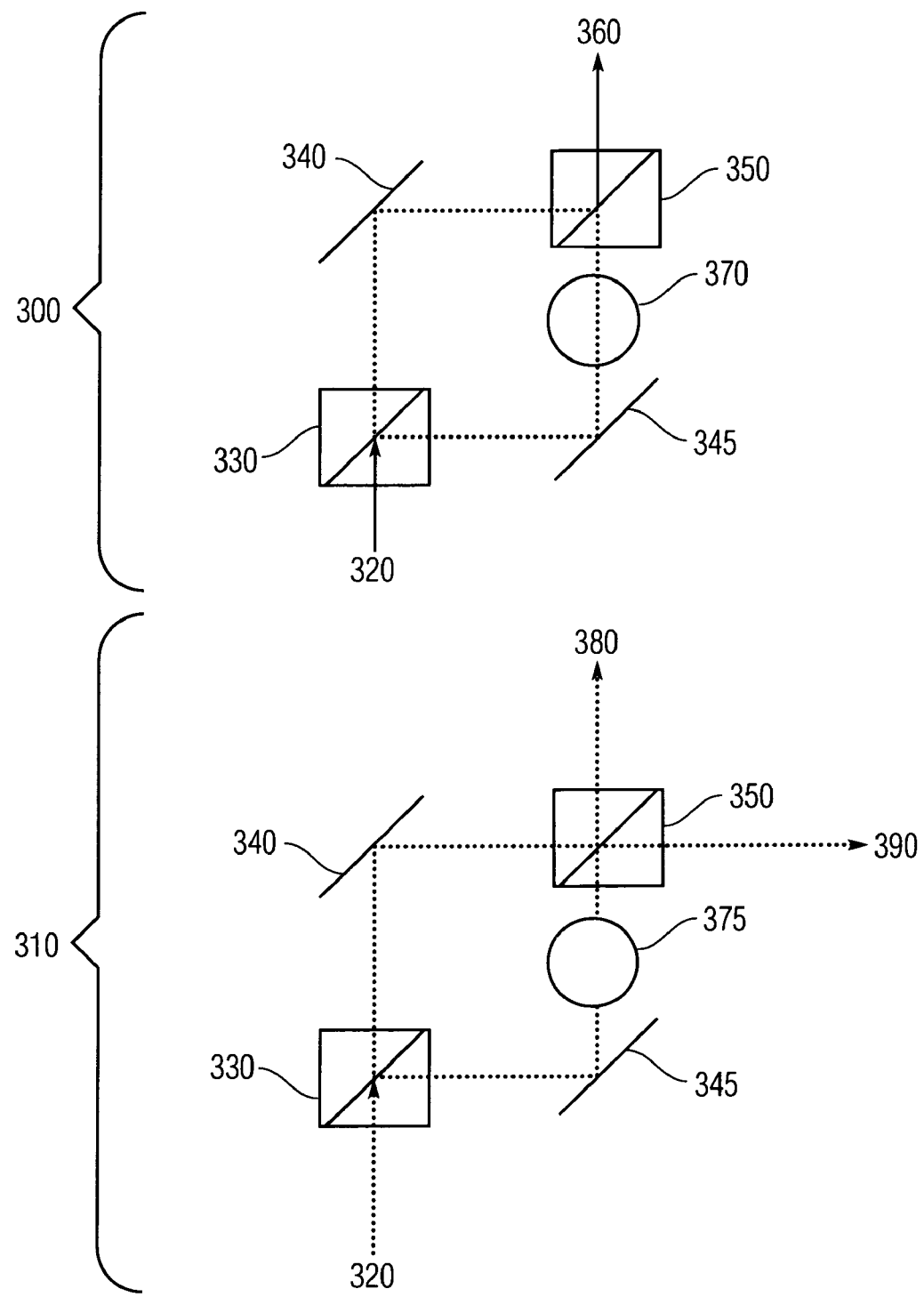
FIG. 3 is a diagram to illustrate the Quantum Zeno effect.

The Quantum Zeno effect represents a method to sense an object "without interacting" with it in the classical sense. FIG. 3 shows a pair of diagrams 300, 310 to illustrate the Quantum Zeno effect, which was the precursor to the Hardy's paradox. The upper diagram 300 shows an MZI schematic in plan view. An incident photon 320 strikes a first beam-splitter 330, which directs the photon to either continuing straight to a first mirror 340 or perpendicular to a second mirror 345. The first mirror 340 reflects the photon to a second beam-splitter 350 facing parallel to and outward from the original direction of the incident photon 320 so that the exiting photon 360 is parallel to the incident photon 320. The second mirror 345 reflects the photon through a non-blocking (i.e., vacant) sample region "S" 370 and exiting through the second beam-splitter 350.

The lower diagram 310 shows the schematic with a blocking sample region "S" 375 replacing the vacant region 370 in the upper diagram 300. The sample region 375 affects the photon 320 by inducing finite probabilities of exiting in one of first and second outward directions 380, 390 being respectively parallel and perpendicular to incident. These probabilities differ from the influence of the vacant sample region 370.

In the upper diagram 300 in FIG. 3, the two 50%:50% beam-splitters 330, 350 and two mirrors 340, 345 form the MZI. With a single beam of light, the interferometer produces two paths of the beam at the first beam-splitter 330. At the second beam-splitter 350, the two beams recombine. As a result, the vertical output 360 of the second beam-splitter 350 represents the "light" port and the horizontal output (to the right) of second beam-splitter 350 represents the "dark" port. The "light" and "dark" ports can be tuned by adequate adjustments of the interferometer.

From a single photon viewpoint, the photon 320 can traverse both paths as defined by the photon's associated quantum mechanical wave-function (denoted in the literature as $\psi$). The wave-function passes through (vacant) region "S" 370 in the upper diagram 300. For a condition in which region "S" is blocked as shown in the lower diagram 310 of FIG. 3. In this case, the wave-function for the photon 320 cannot be regarded within the interferometer as being in a superposition of states. If the photon 320 takes the path blocked by region "S" 375, the photon 320 does not reach the second beam-splitter 350.

However, if the photon 320 takes the path not blocked by region "S", the photon could reach the second beam-splitter 350, but there would not be an interference effect by the photon's associated quantum mechanical wave-function. Consequently, the photon 320 can then exit either the "light" port in the vertical direction 380 or the "dark" port in the horizontal direction 390. By monitoring the "dark" port for photons, the block containing the sample in the region "S" 375 can be sensed "without interacting" with the sample material. This type of sensing can be deduced to occur 25% of the time.

Figure 4:
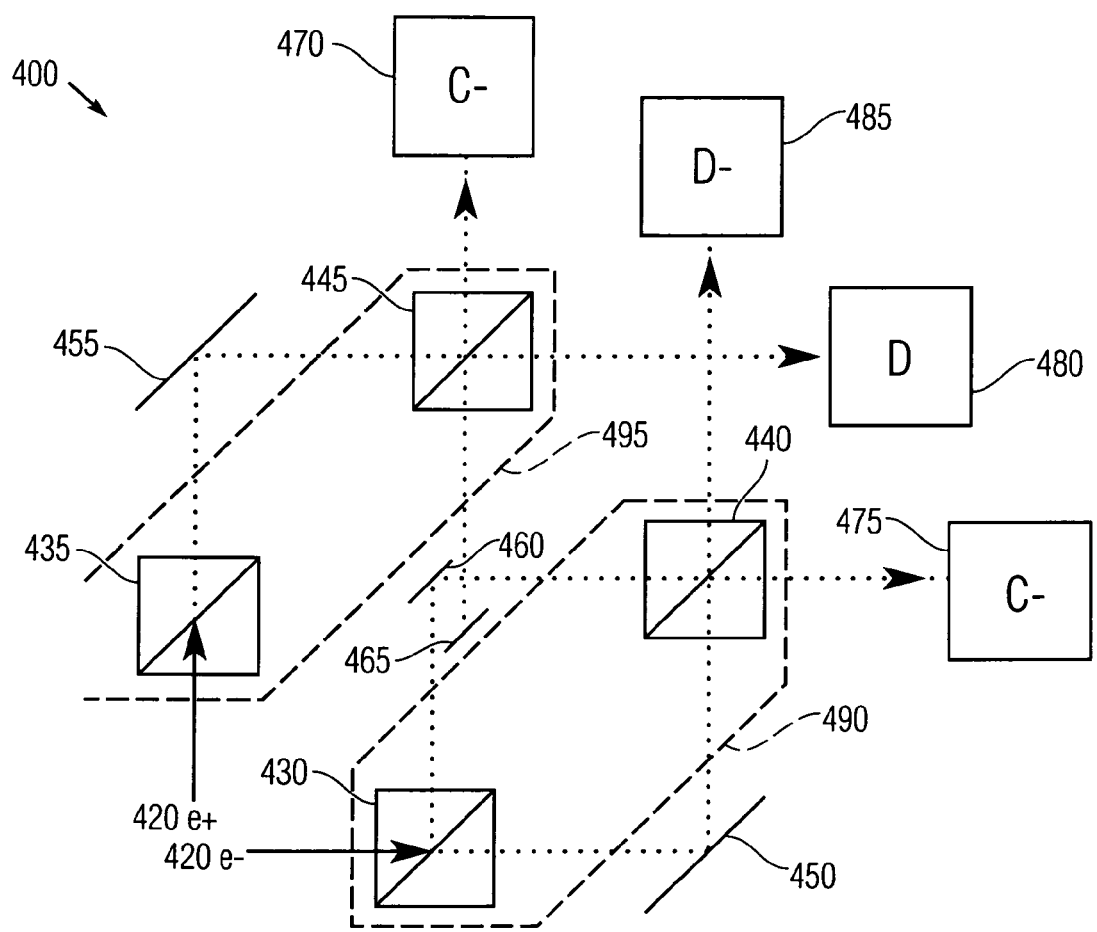
FIG. 4 is a diagram to illustrate Hardy's paradox.

In a simple arrangement such as the Hardy's paradox, two "material" (i.e., fermion) particles such as an electron and a positron can be positioned in two Mach Zehnder interferometers with an overlapping path such that if the electron and positron were to overlap, they would annihilate each other. FIG. 4 shows a diagram 400 of an electron-positron MZI. An electron (e−) 410 and a positron (e+) 420 travel rightward and upward respectively.

The electron 410 and positron 420 respectively reach first and second beam-splitters 430, 435. The overlapping MZI-pair diagram 400 also includes third and fourth beam-splitters 440, 445 discussed subsequently. The diagram 400 further includes first and second outer mirrors 450, 455 as well as first and second inner mirrors 460, 465. The electron 410 either passes through the first beam-splitter 430 to the first outer mirror 450 or else reflects to the first inner mirror 460. Similarly, the positron 420 either passes through the second beam splitter 435 to the second outer mirror 455 or reflects to the second inner mirror 465.

Beyond the third and fourth beam-splitters 440, 445, the diagram 400 incorporates a quad series of detectors: first C+ 470, second C− 475, third D+ 480 and fourth D− 485. From either the first outer mirror 450 or the first inner mirror 460, the electron 410 enters the third beam-splitter 440 and either passes or else reflects to one of the second C− detector 475 and the fourth D− detector 485. From either the second outer mirror 455 or the second inner mirror 465, the positron 420 enters the fourth beam-splitter 445 and either passes or else reflects to one of the first C+ detector 470 and the third D+ detector 480.

The Hardy's paradox can be demonstrated essentially by two Quantum Zeno-effect devices placed in such a way that the electron 410 serves as the block for the positron 420 and vice versa. Hardy's paradox represents the loss of constructive interference with some probability, and yet the electron and positron are not destroyed in the region "S" 370, 375. Yet, loss of constructive interference seems to require electron and positron destruction. (More generally, Hardy's paradox examines an axiom of quantum mechanics that a quantum mechanical particle does not necessarily have a definitive location until there is a measurement.)

Hardy's paradox can be expressed as collocating the electron 410 and the positron 420 in space without a measurement device in place. This applies when the electron and positron are created together and should arrive at a region "S" simultaneously by experimental design. For experimental purposes, use of "non-material" (i.e., boson) particles, such as photons, can be selected as being more advantageous due to greater support available by the photonics industry. However, this advantage can be compromised by the fact that two photons do not annihilate each other under most circumstances. Fortunately, an "annihilation-like" effect can be made using a TPA switch.

The non-linear crystal in the TPA switch serves a dual role in both down-conversion and its opposite, up-conversion. The latter can be manipulated to convert or not-convert the down-converted twin (signal and idler) photons. The two photons, which are in a two-photon quantum state can be induced to up-convert in a well-controlled manner. If the twin photons are converted to a higher energy (i.e., shorter wavelength), the photons of the longer wavelength can be regarded as having "annihilated" each other. However, if one of the twin photons is lost, the other photon cannot be annihilated, so that a type of switching process has occurred due to the presence or absence of the other photon.

Figure 5:
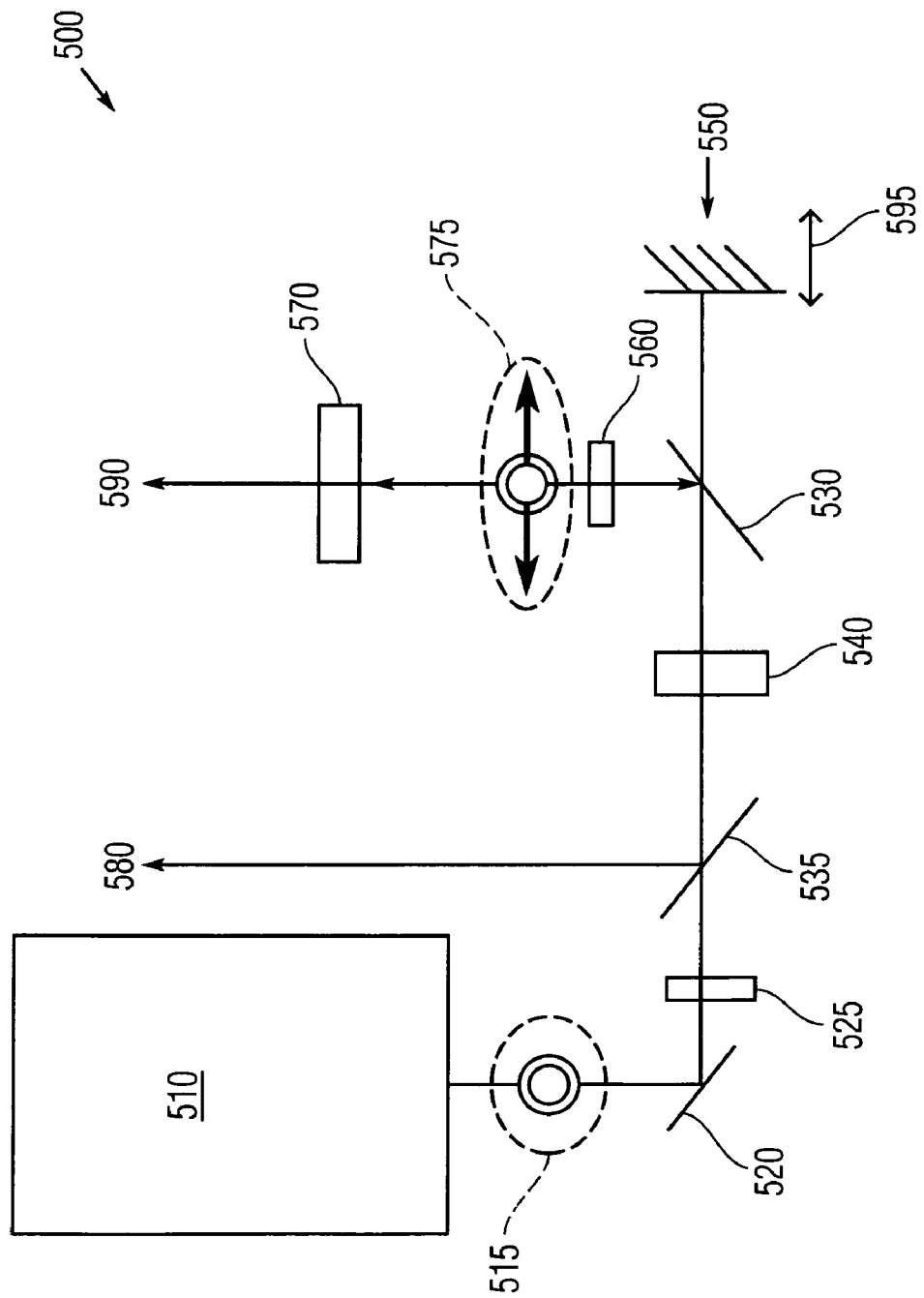
FIG. 5 is a diagram of a two-photon absorptive switch.

FIG. 5 shows an elevation view diagram of the two-photon absorption (TPA) switch 500. A pulse laser 510 emits a pump photon 515 in a vertical state (as indicated by the arrow symbolically extending out from the drawing as well as implicitly into) and having angular frequency ω. The TPA switch 500 includes a first reflector 520, a filter 525, first and second dichroic mirrors 530, 535, a down-conversion crystal 540, a second reflector 550, an optional compensating crystal 560 and a 50%:50% beam-splitter 570. The down-conversion crystal 540 is temperature-tuned and splits the pump photon 515 into a pair of photons 575 in vertical and horizontal states (the latter indicated by left and right arrows) and each having frequency ω/2. The down-conversion crystal 540 can preferably be an NCPM crystal. The dichroic mirrors 530, 535 are disposed to flank either side of the crystal 540 along an incident travel direction of the photons from the reflectors 520, 550. The dichroic mirrors 530, 535 are oriented at slant (45° or π/4 radians) to that incident direction, and thus are oriented perpendicular (90° or π/2 radians) to each other.

The pump photon 515 reflects from the first reflector 520 and passes through the filter 525 to the second dichroic mirror 535. The photon 515 proceeds to the down-conversion crystal 540 to produce with some probability the signal and idler photon pair 575, which reflects at the first dichroic mirror 530. The photon pair 575 passes through the compensating crystal 560 and either reflects or passes through at the beam-splitter 570 to a second output 590. The second reflector 550, being disposed along the incident direction opposite the laser 510, can be translated horizontally (i.e., along the incident direction) shown by arrow 595 to adjust its distance from the crystal 540.

Although the phase between the signal and idler beams in the TPA switch are random, the sum of their phases is coherent with the pump beam. By using the pump beam with a large number of photons comprising classical electromagnetic waves, one of the pump photons 515 can be assumed to "scatter" into the signal and idler photons 575 indicative of a down-conversion. Because the pump beam contains many photons and can be described as being in either a classical or quantum coherent state of light, the loss of a single photon does not significantly change the nature of the pump beam.

Subsequent to down-conversion, the same pump beam remains coherent with itself. The down-converted photons form an entangled state with the phases of the two photons together being coherent with the pump beam. However, each down-converted photon is not coherent with the other or separately with the pump beam. Coherency means that there is a well-defined phase relationship and that interference can occur.

The significance of the pump and two-photon (i.e., signal-and-idler) phase relationship can be expressed as that the two-photon can up-convert in another crystal, so as to satisfy momentum conservation. Alternatively, in the case of retro-reflection, the two-photons can be induced to up-convert in the same crystal depending upon the phase shift between the two-photon and the pump beam. Thus, the switch can be used to up-convert the signal and idler photons, which are at angular frequency ω/2 to an angular frequency of ω. From an angular frequency or wavelength viewpoint, the signal and idler photons are either destroyed or else not dependant upon the phase of the pump beam in the crystal, i.e., switching.

In the MZI diagram 500 of FIG. 5, a pulse laser 510 is used, because the down-conversion process creates a large bandwidth for the signal and idler associated waves and because the bandwidth of a pulse laser 510 is larger than the bandwidth of a continuous wave laser. The filter 525 following the first reflector 520 is used to accommodate the three-wave mixing. The pump wave at an angular frequency of ω passes through the first and second dichroic mirrors 530 and 535. On this first pass the crystal 540 may yield a down-converted pair of photons 575. These photons have a frequency of ω/2 and reflect at the first dichroic mirror 530. For conditions in which the photons are not angular frequency-degenerate, the indices of refraction differ and the photons encounter a different optical path length inside of the crystal 540.

The optional compensating crystal 560 can be used to correct for this difference in optical path length, but can be omitted for a temperature-tuned crystal 540. If one of the two photons is reflected at the 50%:50% beam-splitter 570, this photon makes a second pass through the crystal 540. If the second reflector 550 is adjusted such that the pump photon 515 reflects back in the crystal 540 with a phase such that interference between the first and second pass of the pump photon 515 causes re-mixing of the signal and idler photons 575 to occur, the single photon of photons 575 can still pass through the crystal 540 and then be reflected by the second dichroic mirror 535.

Hence, this process enables a single photon of photons 575 to pass through the crystal 540, whereas if both photons 575 reflect at the 50%:50% beam-splitter 570, the photons 575 would be remixed, that is reconverted to a pump photon 515 of angular frequency ω. Or, more strictly, the pair of photons 575, because they weren't observed in the first place, can be considered to have not been generated at all.

The crystal 540, such as an NCPM crystal, can be composed of a transparent material, such as Lithium Triborate (LBO) or alternatively Ammonium Dihydrogen Phosphate (ADP), as described above. The temperature to which the crystal 540 may be controlled would correspond to the down-conversions for specific temperature values depending on type and material, as described above. In relation to an optical version of Hardy's Paradox in FIG. 4, the NCPM crystal 540 may be disposed within photon paths between the mirrors 460 and 465. The first and third beam-splitters 430, 440 can be combined into a first pair 490 to form a single monolithic MZI. The second and fourth beam-splitters 435, 445 can also be similarly combined as a second pair 495. Such beam-splitter combinations are described further for monolith configurations.

The retro-reflection phases of the pump, signal, and idler may presumably be adjusted to suppress or enhance the likelihood of a pair production through the second pass. In this case, the pair production of the first pass through the crystal would interfere with the pair production of the second pass through the crystal 540 due to an uncertainty of "which-path" information of the pump through the crystal 540. The setup for this interference reflected both signal and idler photons, and this interference is of interest to consider for other types of photon manipulation.

There exist a number of methods to generate the Bell states, which include the two varieties of EPR states. The utility of these methods have which-path shortcomings using angle-tuned crystals. On the other hand, angle-tuned crystals are less expensive and do not require temperature control. By contrast, NCPM crystals may require a heater or cooler, and a temperature servo-loop. Also, the NCPM crystals are limited in operable wavelengths, because the temperature-tuning requires the indices of refraction to be temperature sensitive, and practical limits constrain the extent of enabling the conservation of momentum of the photons to occur within the crystal. Hence, NCPM crystals are not used as often as angle-tuned crystals in the industry. The penalty for using angle-tuned crystals involves the possibility of introducing which-path information in a quantum system and then incorporating a clever method, if possible, for its removal.

A simplified expression for the wave-function $|\Psi\rangle$ that can be produced for the EPR states by the proposed source can be written as:

$$|\Psi\rangle = |\updownarrow\rangle_1 |\leftrightarrow\rangle + f e^{i\delta} |\leftrightarrow\rangle |\updownarrow\rangle, \quad (1)$$

where the ket components include the wave-function and the horizontal and vertical states, as described above. The wave-function shows that a plus (+) or minus (−) sign can be generated by $e^{i\delta}$ when $\delta$ has the appropriate phase relation between the two crystals. The f appearing in the expression is a possible attenuation factor that might appear.

The $\chi^{(2)}$ crystals have non-linearities describable in tensor notation. These non-linearities are related to the i, j, or k direction of the polarization of the three photons, typically referred to as the pump→signal+idler in the down-conversion, and signal+idler→pump in the up-conversion. The non-linear optical susceptibility tensor are described in the wave picture of light. Two optical fields can be described as follows: The first optical field can be written:

$$E_j^{(\omega 1)}(t) = Re(E_j^{\omega 1} e^{i(\omega 1)t}), \quad (2)$$

in which the j direction indicates the signal field direction, and $\omega_1$ is the first angular frequency. The second optical field is:

$$E_k^{(\omega 2)}(t) = Re(E_k^{\omega 2} e^{i(\omega 2)t}), \quad (3)$$

in which the k direction indicates the idler field direction and $\omega_2$ is the second angular frequency.

A nonlinear coupling of these two fields can yield a polarization component P at $\omega_3 = \omega_1 + \omega_2$ along the i direction. Formally, this means $$P_i^{(\omega 3)}(t) = Re(P_i^{\omega 3} e^{i(\omega 3)t}), \quad (4)$$

such that $\omega_3 = \omega_1 + \omega_2$. The nonlinear susceptibility tensor $d_{ijk}^{(\omega 3)=(\omega 1)+(\omega 2)}$ can be expressed as $$P_i^{(\omega 3)} = 2 d_{ijk}^{(\omega 3)=(\omega 1)+(\omega 2)} E_j^{(\omega 1)} E_k^{(\omega 2)}, \quad (5)$$

with the convention that the repeated indices i, j and k are summed. The $j^{th}$ and $k^{th}$ components of the electric field can be interchanged without any physical significance. The magnitude of the electric field vector E can be expressed using the square of the scalar $E^2$, such that:

$$E^2 = (E_x + E_y + E_z)^2 = E_x^2 + E_y^2 + E_z^2 + 2E_z E_y + 2E_z E_x + 2E_x E_y, \quad (6)$$

where scalar components $E_x$, $E_y$ and $E_z$ represent strengths in their respective orthogonal directions.

The relationship of the P-field and $E^2$ can be expressed in matrix notation to facilitate understanding of select characteristics of non-centrosymmetric crystals. This expression can be shown as:

$$\begin{bmatrix} P_x \\ P_y \\ P_z \end{bmatrix} = \begin{pmatrix} d_{11} & d_{12} & d_{13} & d_{14} & d_{15} & d_{16} \\ d_{21} & d_{22} & d_{23} & d_{24} & d_{25} & d_{26} \\ d_{31} & d_{32} & d_{33} & d_{34} & d_{35} & d_{36} \end{pmatrix} \begin{bmatrix} E_x^2 \\ E_y^2 \\ E_z^2 \\ 2E_z E_y \\ 2E_z E_x \\ 2E_x E_y \end{bmatrix}, \quad (7)$$

where the second subscript is written in a contracted notation, in which xx=1, yy=2, zz=3, yz=zy=4, xz=zx=5, and xy=yx=6. One characteristic of these crystals is that for any given crystal $d_{jk}$ may or may not be zero, meaning that the crystal does not necessarily have a non-linear susceptibility tensor for a particular j, and k.

The proper non-linear susceptibility tensor should be non-zero for the type II operation of the state of the TPA switch 500 in which the signal and idler photons 575 have different polarization states, e.g., the signal being vertical and the idler being horizontal. Consequently, the crystal 540 behaves non-linearly enabling switch operation. Of course, the crystal 540 may preferably appear relatively transparent at the wavelengths of the photons employed.

In addition, the crystal 540 may preferably have momentum conservation in the photon characterization or phase-matching in the wave characterization of light. For example, both criteria lead to the refraction index relation $2n_f^{2\omega} = n_f^{\omega} + n_s^{\omega}$ for a biaxial crystal operating in a type II degenerate up- or down-conversion. The $2\omega$ terms refers to the high energy (i.e., pump) photon, whereas the $\omega$ refers to a low energy (i.e., signal or idler) photon with half the energy as the high energy photon. The subscripts reference f for fast and s for slow indicate a relation for the indices of refraction as being $n_f < n_s$, because a photon propagates at c/n, in which c is the speed of light in a vacuum. Under satisfaction of $2n_f^{2\omega} = n_f^{\omega} + n_s^{\omega}$, type II degenerate up- or down-conversion can occur.

The biaxial crystal is a complicated crystal in that a wave vibrating in the plane spanned by the optic axis of the crystal and the propagating beam will typically walk-off from a beam in which the wave does not vibrate in the earlier described plane. A biaxial crystal has three different indices of refraction related to the three crystallographic axis. In a uniaxial crystal, two of the indices of refraction are degenerate and propagate along the x and y axis, whereas the index of refraction along the z axis differs and the optic axis propagates along the z axis.

For the sake of clarity, the terms ordinary beam for a beam that does not walk-off and extraordinary beam for a beam that does walk-off are used herein. These are terms usually used for uniaxial crystal, but can be applied for further description for the biaxial crystal under simplified circumstances. According to Snell's law, light propagating normal to an air/transparent medium interface continues in the same direction both in air and in a solid transparent medium, such as glass. A beam that acts in accordance with Snell's law is termed to be "ordinary" for these purposes. For a beam of light that does not behave as described above, the "extraordinary" beam in a crystal permits walk-off, whereas the "ordinary" beam in a crystal lacks the walk-off behavior.

Conventionally, to generate an optical version of the EPR state or as a TPA switch involves crystals that have beams, which walk-off from one another. Thus, for the conventional arrangement, the momentum-conservation condition, $2n_f^{2\omega} = n_f^{\omega} + n_s^{\omega}$, is generally not satisfied, yielding a resort to angle-tuning to compensate. For extraordinary beams, the index of refraction can be expressed as a function of the two angles θ and φ defined relative to the crystallographic axes.

Although angle-tuning can be used to satisfy the preceding equation, the beams do not stay together and partial which-path information is gained. In addition, the walk-off inhibits coupling among the signal and idler photons. In a biaxial crystal, all of the beams are generally extraordinary, so these beams would be generally expected to walk-off from one another. However, along crystallographic axes, they do not walk-off and the momentum conservation condition can sometimes be satisfied by cooling or heating the crystal.

Various exemplary embodiments provide for the elimination of which-path information, which results from double refraction in the crystal. Generally, crystals have anisotropic properties for the magnetic and electric fields. Magnetic anisotropy can be neglected as of minimum consequence. Only the electric anisotropy relates to the light beam, being an electro-magnetic wave, is considered relevant to these applications.

Double refraction in a crystal is described by M. Born and E. Wolf, *Principles of Optics* 7/e, Cambridge, ©1999, ISBN 0521642221, ch. XV, §15.3.4(a), pp. 790ff. One can assume that the electric fields within the crystal have the following linear anisotropic relationship between a first dielectric vector $\vec{D}$ and a second dielectric vector $\vec{E}$ related by a symmetric nine-component tensor such that $$\begin{bmatrix} D_x \\ D_y \\ D_z \end{bmatrix} = \begin{pmatrix} \varepsilon_{xx} & \varepsilon_{xy} & \varepsilon_{xz} \\ \varepsilon_{yx} & \varepsilon_{yy} & \varepsilon_{yz} \\ \varepsilon_{zx} & \varepsilon_{zy} & \varepsilon_{zz} \end{pmatrix} \begin{bmatrix} E_x \\ E_y \\ E_z \end{bmatrix}. \quad (8)$$

The electric energy density $w_e$ has the same form as in the isotropic case, which is $$w_e = \frac{1}{8\pi} \vec{E} \cdot \vec{D}.$$

The electric energy density can be made more explicit for the anisotropic case. The dielectric tensor $$\begin{pmatrix} \varepsilon_{xx} & \varepsilon_{xy} & \varepsilon_{xz} \\ \varepsilon_{yx} & \varepsilon_{yy} & \varepsilon_{yz} \\ \varepsilon_{zx} & \varepsilon_{zy} & \varepsilon_{zz} \end{pmatrix}$$

in eqn. (8) forms a symmetric tensor and thereby converts to a three-component tensor with a proper transformation to the principal axis of the crystal, in which the expression, $$\varepsilon_x x^2 + \varepsilon_y y^2 + \varepsilon_z z^2 = C, \quad (9)$$

where C is a constant, can be obtained. Using the principal dielectric axis, some simple expressions are true, that is $D_x = \varepsilon_x E_x$, $D_y = \varepsilon_y E_y$, and $D_z = \varepsilon_z E_z$. The electric energy density, $w_e$, takes on the following forms:

$$w_e = \frac{1}{8\pi} (\varepsilon_x E_x^2 + \varepsilon_y E_y^2 + \varepsilon_z E_z^2) = \frac{1}{8\pi} \left( \frac{D_x^2}{\varepsilon_x} + \frac{D_y^2}{\varepsilon_y} + \frac{D_z^2}{\varepsilon_z} \right). \quad (10)$$

Quoting Born and Wolf further: "It may be seen immediately from these formulae that $\vec{D}$ and $\vec{E}$ will have different directions, unless $\vec{D}$ and $\vec{E}$ coincides in direction with one of the principal axes, or the principal dielectrics are all equal; in the later case $\varepsilon_x = \varepsilon_y = \varepsilon_z$ the ellipsoid degenerates into a sphere." The ordinary beam is such that the principal dielectrics are all equal. For a uniaxial crystal, the extra-ordinary beam is such that two of the dielectrics are equal, e.g., $\varepsilon_x = \varepsilon_y \neq \varepsilon_z$. For a biaxial crystal, the dielectrics are such that none of the dielectrics are equal, e.g., $\varepsilon_x \neq \varepsilon_y \neq \varepsilon_z$. Thus, beam walk-off for a biaxial crystal can be avoided when the beams are going along one of the principal dielectric axes.

Figure 6:
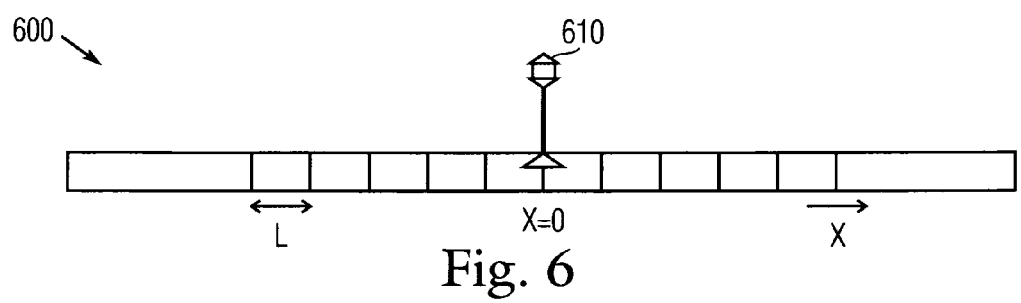
FIG. 6 is an elevation diagram of classical random-walk.

The classical random-walk, as shown in FIG. 6 as an elevation diagram 600, has a location X as the product of an integer m multiplied by the step length L as measured from a lamp-post 610 that represents the origin. After N steps, the integer m can be at a minimum of −N or at a maximum of +N. For m to be −N, all N steps must be to the left, which has a small probability, and likewise for m to be +N, all N steps must be to the right, which also has a small probability. All things being equal the likelihood for m to be −N or +N is the same. The most likelihood for the value of m is 0 corresponding to a position at the lamp-post 610. A repeated process of the classical random-walk yields a diffusion effect.

A quantum random-walk has much more interesting features. In the quantum random-walk, the quantum particle, analogized metaphorically as a drunk, does not move left or right at each step, but "moves" in "ket" state vectors of |←⟩ (left) and |→⟩ (right) in each translatable direction. The quantum wave associated with the quantum particle determines the outcome of where the likelihood of the position of the particle, immediately. The quantum wave, if coherent for all of the steps, can exhibit constructive or destructive interference, so that the likelihood of the final position of the particle differs considerably from a diffusion effect.

Figure 7:
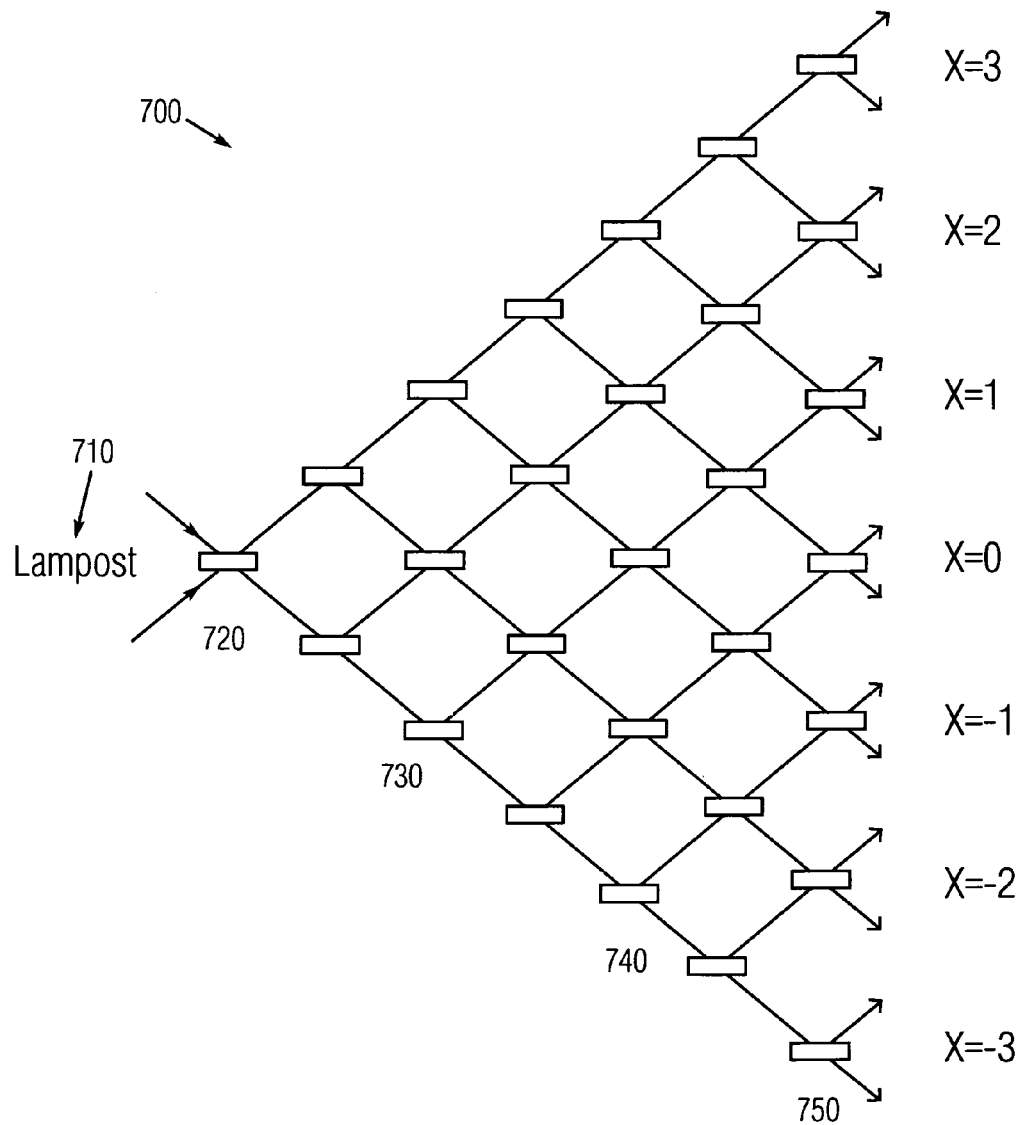
FIG. 7 is a plan diagram of quantum random-walk by a particle.

A method for examining the quantum random-walk is of high experimental interest. For example, the random-walk of plants may have to be quantum in nature for photo-synthesis to occur at such a high efficiency. An apparatus utilizing an MZI configuration is shown in FIG. 7 in a plan diagram 700. A cascading series of beam-splitters expands from an origin represented by a lamp-post 710. The cascades are represented by a series of MZI steps: zeroth step 720, first step 730, second step 740 and third step 750. Depending on the path, the photon could arrive at one of a variety of positions corresponding to output ports, denoted by X=−3, −2, −1, 0, +1, +2, +3. Experimentally, a single photon, the light-wave equivalent particle, could be injected into one of the ports of the MZI at the lamp-post 710. The photon would appear at one of the output ports of a third step. The number of steps is not limited by three as shown in this explanatory example, but by practical construction considerations and cost.

An edge MZI can be constructed with only one input port. In practice, there are two input ports with the input port not depicted would have a quantum vacuum ket state |vac⟩ entering that MZI. The vacuum state is a non-zero fluctuation of the quantized radiation field without a photon associated with that field. Some aspects of the quantum random-walk can be studied with the twin MZI because of its two-step depth structure (i.e., without width) of the quantum random-walk. The input light-wave can be a continuous quantum state such as the quantum coherent state or a quantum squeezed state.

Figure 8:
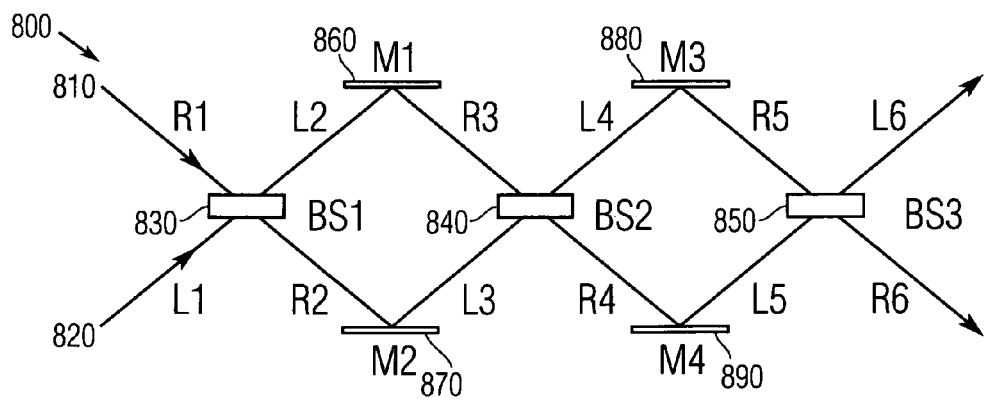
FIG. 8 is a plan diagram of a twin Mach-Zehnder Interferometer (MZI)

For example, FIG. 8 illustrates a simplified twin Mach-Zehnder Interferometer (MZI) structure in a plan diagram 800. Upper and lower photons 810, 820 enter a first beam-splitter (BS1) 830 by respective paths R1 and L1. Second and third beam-splitters (BS2, BS3) 840, 850 are disposed further down-stream. The photons proceed to one of first and second mirrors (M1, M2) 860, 870 and reflect to the second beam-splitter (BS2) 840. From there, the photons continue to third and fourth mirrors (M3, M4) 880, 890 and are reflected to the third beam-splitter (BS3) 850 from which they exit.

The photon paths oriented diagonally downward (towards the right) are denoted by R1, R2, R3, R4, R5 and R6. The photon paths oriented diagonally upward (towards the right) are denoted by L1, L2, L3, L4, L5 and L6. The beam-splitters 830, 840, 850 have a plate configuration with a 45° angle of incidence for incoming light, which can be used in a cube-style beam-splitter as described subsequently. By contrast, the beam-splitter 570 represents a plate-style beam-splitter designed for normal angle of incidence incoming light.

These principles can be extended to geometries for a monolithic (single-piece) multiple MZI. The objectives of a quantum optics experiment may be compromised, if instabilities occur in the path of the photons within the experimental apparatus. These instabilities can be a result of thermal gradients and fluctuations, as well as vibrations. The quantum optics experimental community has so far used active stabilization at most for keeping optical elements fixed relative to each other.

Figure 9:
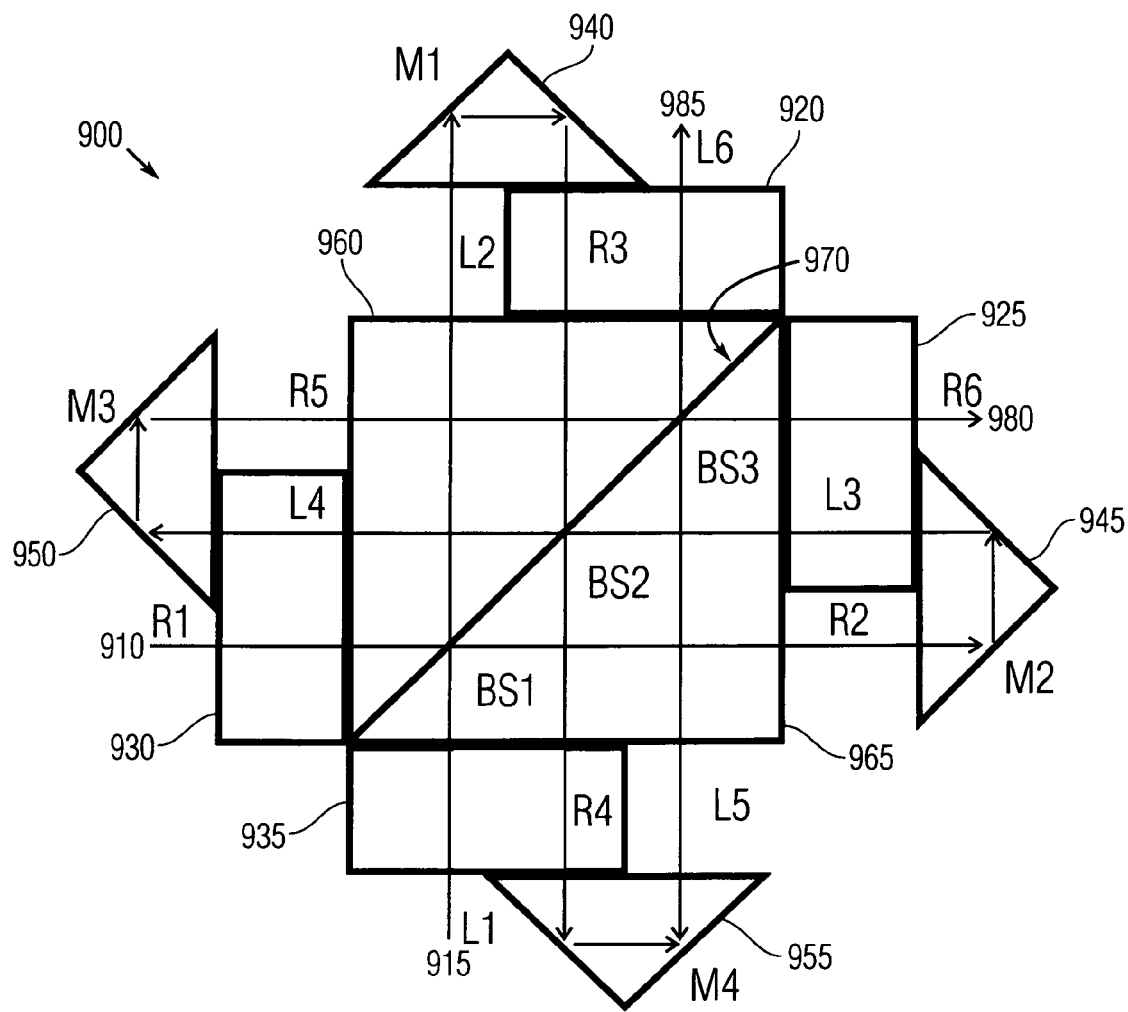
FIG. 9 is a plan view of a monolithic twin MZI.

The optical elements, such as mirrors, lenses, and beam-splitters are typically held in separate opto-mechanical mounts. Outside of this community, researchers and device developers are migrating toward more monolithic constructions. To provide for several experiments that utilize MZI components joined to each other as shown in FIG. 9 as a plan view diagram 900 for a twin MZI monolith. The monolith mitigates problems associated with path instabilities.

FIG. 9 shows first and second photons 910, 915 respectively traveling along horizontal path R1 and vertical path L1. The twin monolithic design comprises a beam-splitter cube and a spacer-trombone prism on four of the cube faces. The monolith has to be carefully aligned during construction, so that each MZI is functional and that there are spaces for probes to be inserted within the monolith for the experiments. Artisans of ordinary skill will recognize that the trombone prism (e.g., porro prism) translates a beam so that a photon exits in a direction opposite and parallel to its entrance, thereby enabling the monolith optics to function. The trombone prism functionally represents two mirrors, rather than a single mirror, as shown in the schematic.

The twin MZI pair includes spacers 920, 925, 930, 935, porro prism mirrors 940, 945, 950, 955 and triangular prisms 960, 965 that form the beam-splitter cube with a diagonal interface 970 from lower left to upper right corners to form three beam-splitter intersections. The first photon 910 travels along path R1 through the third spacer 930 and the first prism 960, striking the interface 970 at the first intersection BS1. Similarly, the second photon 915 travels along path L1 through the fourth spacer 935 and the second prism 965, also striking the first intersection BS1.

In a more generalized description, the MZI can be composed of a complimentary pair of right-isosceles triangular prisms, and several trombone reflector units. The triangular prisms are configurable to physically join together along associated hypotenuse surfaces that form a beam-splitter interface, thereby producing a rectangular prism having a square cross-section with four outer side surfaces. Each reflector unit forms a right-isosceles mirror that rigidly faces a corresponding surface of the four outer side surfaces of the rectangular prism. The MZI can further include a spacer disposed between the corresponding surface and the each reflector unit.

The photons can travel either horizontally along path R2 to the second mirror 945 to be offset and return along path L3 to the second intersection BS2, or else vertically along path L2 to the first mirror 940 and return along path R3 also to the second intersection BS2. The photons can proceed either horizontally along path L4 to the third mirror 950 to be offset and return along path R5 to the third intersection BS3, or else vertically along path R4 to the fourth mirror 955 and return along path. L5 also to the third intersection BS3. The photons can then pass either horizontally through the second prism 965 and the second spacer 925 to exit along path R6 towards a horizontal detector station 980, or else vertically through the first prism 960 and the first spacer 920 to exit along path L6 towards a vertical detector station 985. The photon paths R2, R5, L2 and L5 each traverse through an access space between their respective mirrors (M2, M3, M1, M4) and the prisms separated by the spacers. The access spaces provide a region in which an experimenter can dispose a sample or other object into the optical beam path.

The transparent components of the twin MZI pair can be composed of a transparent glass material. Such materials typically have low thermal expansion coefficients. Depending on the ambient conditions, the twin MZI pair may be temperature stabilized passively by thermal insulation, or actively in a temperature-controlled chamber. Temperature adjustments involve gradual heating or cooling such components to avoid physical damage from uneven expansion.

Figure 10:
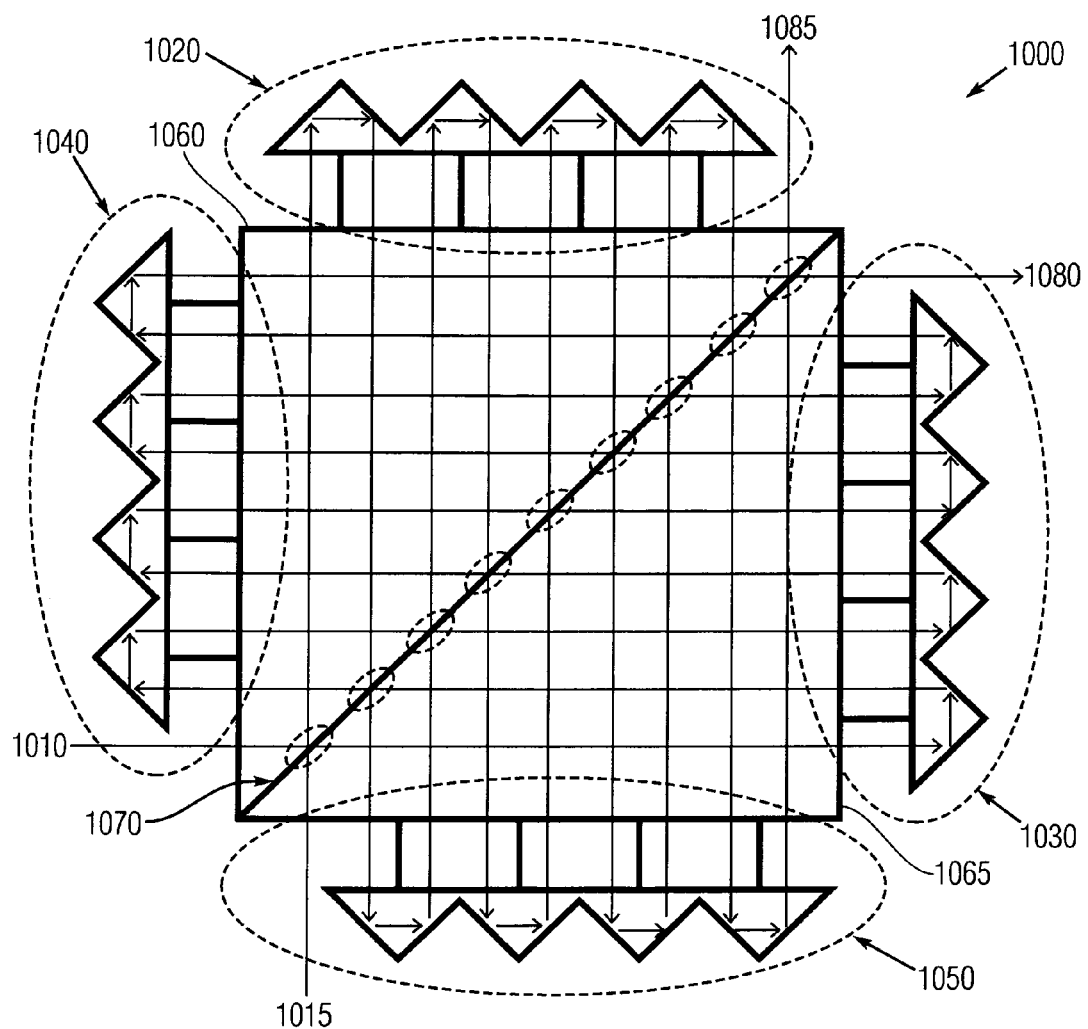
FIG. 10 is a plan view of a monolithic multi MZI.

A depth-only random-walk can be monolithically built by simple extensions of the monolithic twin MZI shown in diagram 900. The method can be expanded as shown in the FIG. 10 as another example plan view diagram 1000 of a monolithic multi MZI, although this extension can be continued yet further. Photons 1010 and 1015 travel horizontally and vertically respectively towards the monolithic multi MZI, which comprises concatenated series assemblies 1020, 1030, 1040, 1050 of porro prism mirrors and associated spacers on each of the four square faces formed by the prisms 1060, 1065 that form the beam-splitter interface 1070. Through the various beam-splitters, the photons travel until exiting to horizontal and vertical detectors 1080, 1085 respectively.

Figure 11:
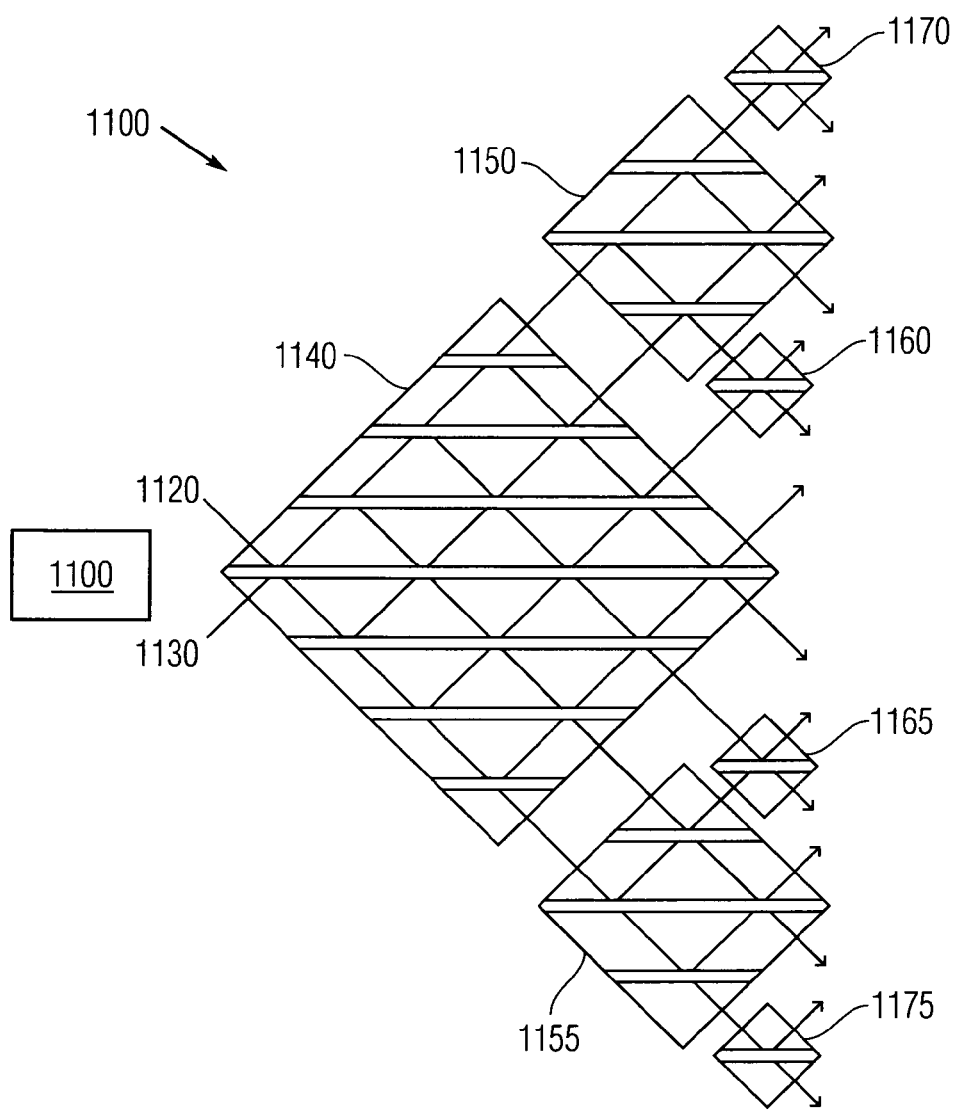
FIG. 11 is a semi-monolithic optical random-walk.

FIG. 11 shows a semi-monolithic optical random-walk in a plan view diagram 1100. Originating at a lamp-post 1110, a pair of photons 1120, 1130 enter a center monolith prism 1140 along diagonal interfaces, analogous to the FIG. 8 MZI. Through a series of seven beam-splitter levels (i.e., zero, upper and lower one, . . . , upper and lower six), the photons can proceed to at least one of upper and lower monoliths 1150, 1155 and auxiliary beam-splitters 1160, 1165, 1170, 1175 adjacent thereto. The photons can exit to a series of outputs as analogously shown in FIG. 7 for quantum random-walk.

The width part on the random-walk can be accomplished by adding beam-splitters in spaces to direct the beams upward (as a convention for positive direction on the x-axis) and downward (as a convention for negative direction on the x-axis). In FIG. 11, upward may be progressively exemplified by the first beam-splitter 1160, upper monolith 1150 and third beam-splitter 1170. Similarly, downward may be progressively exemplified by the second beam-splitter 1165, lower monolith 1155 and fourth beam-splitter 1175. So, above and below the center monolith 1140, monoliths can be added of the correct size, which for the random-walk require a smaller MZI number monolith, and beam-splitters to connect the monoliths optically together. This process can also be shown in FIG. 12 as a functionally explanatory diagram 1200.

Figure 12:
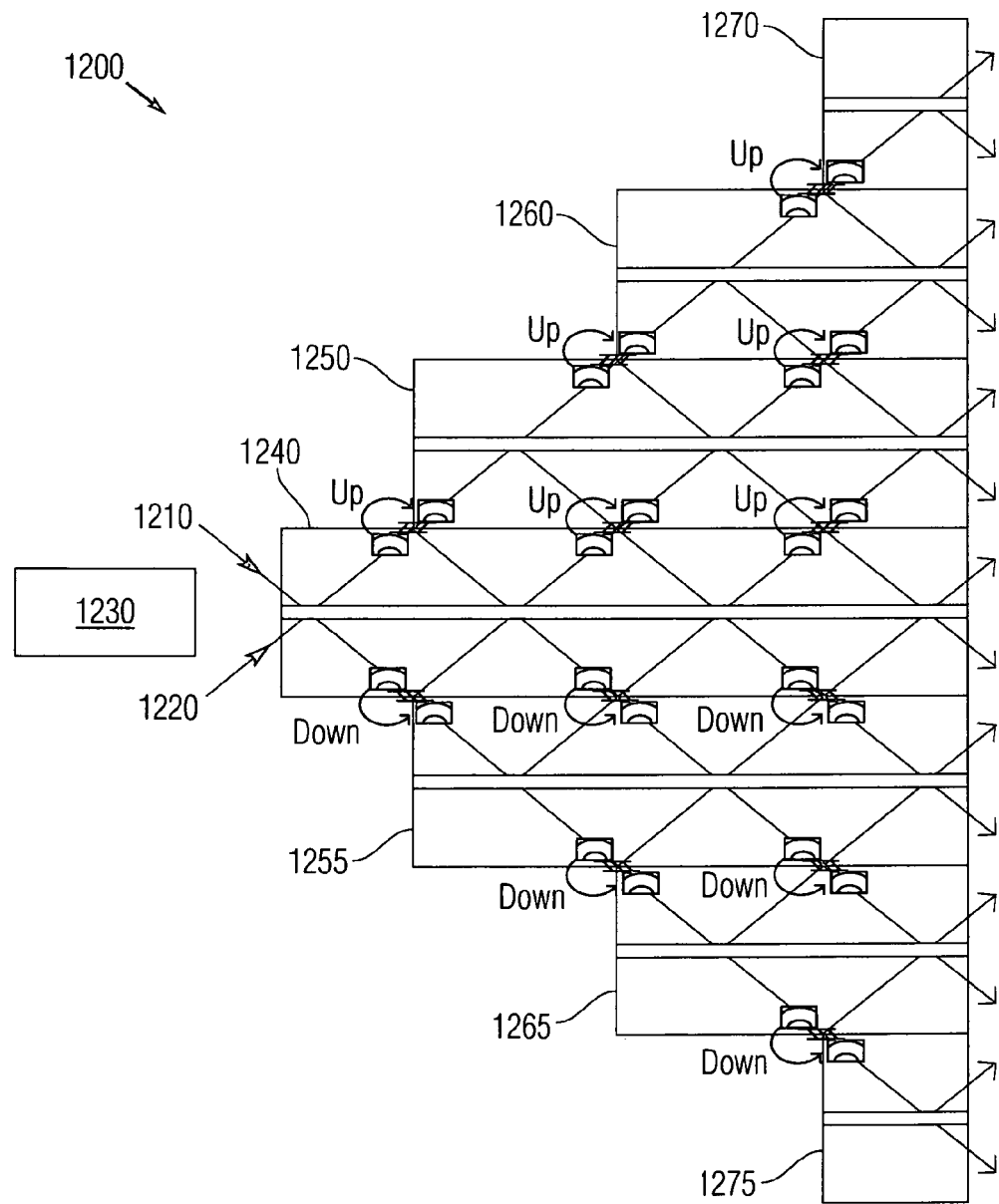
FIG. 12 is a diagram of random-walk by a particle using a monolithic multi MZI.

In particular, FIG. 12 illustrates a pair of photons 1210, 1220 originating at a lamp-post 1230 diagonally encountering a cascading set of prisms oriented horizontally and parallel to their respective beam-splitters. The photons 1210, 1220 enter a center prism 1240 flanked by first upper and lower adjacent prisms 1250, 1255. Beam-splitters in an access space operate their corner intersections with up and down orientations respectively and communicate through trombone prisms there-between. Similarly, second upper and lower adjacent prisms 1260, 1265 flank their respective first adjacent prisms. Finally, third upper and lower adjacent prisms 1270, 1275 flank their respective second adjacent prisms. There are some trade-offs to this second method of the optical random-walk that occurs when routing between upper and lower prisms, but this may be acceptable for some applications.

The monolith can be incorporated into a variety of embodiments, such as: a) the use of polarizing beam-splitters with wave-plates instead of 50%:50% beam-splitters; b) the use of other monolithic methods, such as plates to hold the individual pieces; c) the use of glass or plastic molds to make the monolithic structure in whole or in parts; d) the beam-splitters of each monolith for a full random-walk experiment could be constructed with one beam-splitter, if it has an appropriate height; or e) other methods generally known to the manufacturing state of the art. Finally, the quantum random-walk may experimentally be served by the insertion of optical elements that shift the phase at certain locations within the monolithic structure to obtain the desired result of the experiment for matching the theoretical goal.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A monolithic Mach-Zehnder Interferometer (MZI) for photon beam-splitting, said MZI comprising:
    a complimentary pair of right-isosceles triangular prisms configurable to physically join together along associated hypotenuse surfaces that form a beam-splitter interface, thereby producing a rectangular prism having a square cross-section with four outer side surfaces;
    a plurality of trombone reflector units, each reflector unit forming a right-isosceles mirror that rigidly faces a corresponding surface of said four outer side surfaces of said rectangular prism; and
    a plurality of spacers, wherein each spacer is correspondingly disposed between said reflector unit and said corresponding surface of said rectangular prism to provide a corresponding space, each said space being receptive to a probe inserted therein.

2. The monolithic MZI according to claim 1, wherein said corresponding surface represents two surfaces of said four outer side surfaces.

3. The monolithic MZI according to claim 1, wherein said each reflector unit incorporates a plurality of porro prisms.

4. The monolithic MZI according to claim 1, wherein said MZI is composed of a unitary assembly.

5. The monolithic MZI according to claim 1, wherein said MZI is composed of optically transparent materials for at least one of anti-reflection at the surfaces and facilitating beam splitting.

6. The monolithic MZI according to claim 5, wherein said MZI is composed of glass.

7. A two-photon absorption (TPA) switch for minimizing which-path information in quantum optic interference, comprising:
    a pulse laser that emits a pump photon in a state having pump angular frequency, said pump photon traveling along a photon-incident direction;
    a complimentary pair of right-isosceles triangular prisms configurable to physically join together along associated hypotenuse surfaces that form a beam-splitter interface, thereby producing a rectangular prism having a square cross-section with four outer side surfaces;
    a plurality of trombone reflector units, each reflector unit forming a right-isosceles mirror that rigidly faces a corresponding surface of said four outer side surfaces of said rectangular prism; and
    a down-conversion crystal disposed between a pair of said plurality of trombone reflector units along said incident direction, said crystal being non-critically phase-matched with down-conversion from said pump photon to signal and idler photons controlled by temperature of said crystal, said signal and idler photons in corresponding entangled states with both photons and having half of said pump angular frequency, said entangled states being orthogonal to each other.

8. The TPA switch according to claim 7, wherein said crystal has a same point group for one of type I with identical polarizations between said signal and idler photons and type II with perpendicular polarizations between said signal and idler photons.

9. The TPA switch according to claim 8, wherein said crystal is composed of Lithium Triborate.

10. The TPA switch according to claim 7, wherein said crystal having a same point group for type I with identical polarizations between said signal and idler photons.

11. The TPA switch according to claim 10, wherein said crystal is composed of Ammonium Dihydrogen Phosphate.

12. The TPA switch according to claim 7, further comprising:
    a spacer disposed between said corresponding surface and said each reflector unit to produce a gap into which to dispose said crystal.

\* \* \* \* \*